United States Patent [19]
Ericsson

[11] 4,083,463
[45] Apr. 11, 1978

[54] SUSPENSION DEVICE FOR FELLING UNIT
[75] Inventor: Jan-Eje Ericsson, Sundsvall, Sweden
[73] Assignee: Umea Mekaniska AB, Sweden
[21] Appl. No.: 744,343
[22] Filed: Nov. 23, 1976
[30] Foreign Application Priority Data
  Jan. 9, 1976   Sweden .................................. 7600951
[51] Int. Cl.² .......................... A01G 23/08; E02F 3/32
[52] U.S. Cl. ................................ 214/138 R; 144/3 D;
                                                       144/34 R
[58] Field of Search ................... 214/138 R, 140, 779,
       214/130 C; 144/2 Z, 3 D, 34 R, 34 E, 309 AC

[56]       References Cited
       U.S. PATENT DOCUMENTS

| 3,247,986 | 4/1966 | Eyler et al. | 214/138 R |
| 3,283,928 | 11/1966 | Bosredon | 214/138 R |
| 3,590,760 | 7/1971 | Boyd | 144/309 AC |
| 3,643,712 | 2/1972 | Doel et al. | 144/3 D |
| 3,735,786 | 5/1973 | Vit | 144/309 AC |
| 3,796,242 | 3/1974 | Albright | 144/309 AC |
| 3,896,950 | 7/1975 | McCain | 214/138 R |
| 3,963,130 | 6/1976 | Maynard | 214/130 C |
| 3,999,670 | 12/1976 | Weyhausen | 214/138 R |

Primary Examiner—Othell M. Simpson
Assistant Examiner—W. D. Bray
Attorney, Agent, or Firm—Burns, Doane, Swecker & Mathis

[57]            ABSTRACT

According to the invention, a tree-felling unit is suspended on a crane boom by a device comprising a rotor pivotally suspended on the boom and carrying the felling unit by way of a link member.

10 Claims, 7 Drawing Figures

SUSPENSION DEVICE FOR FELLING UNIT

This invention relates to a device for suspending a felling unit on a crane boom or the like, comprising a rotator for rotating the felling unit in relation to the boom. The invention has the object of providing a suspension device, which renders directional felling of trees possible, i.e. which is so constructed that trees can be felled in the desired direction even under difficult conditions, for example at strong wind, which is not possible with the known suspension devices intended for felling units and provided with a rotator. The suspension device according to the invention also has the object of rendering it possible to cut the roots of windthrow and at felling units equipped with a grapple to use the same as timber grapple for moving the tree felled by the felling unit to the desired place within the working range of the crane.

These objects are achieved thereby that the suspension device according to the invention has been given the characterizing features defined in the claims.

Figure 1:
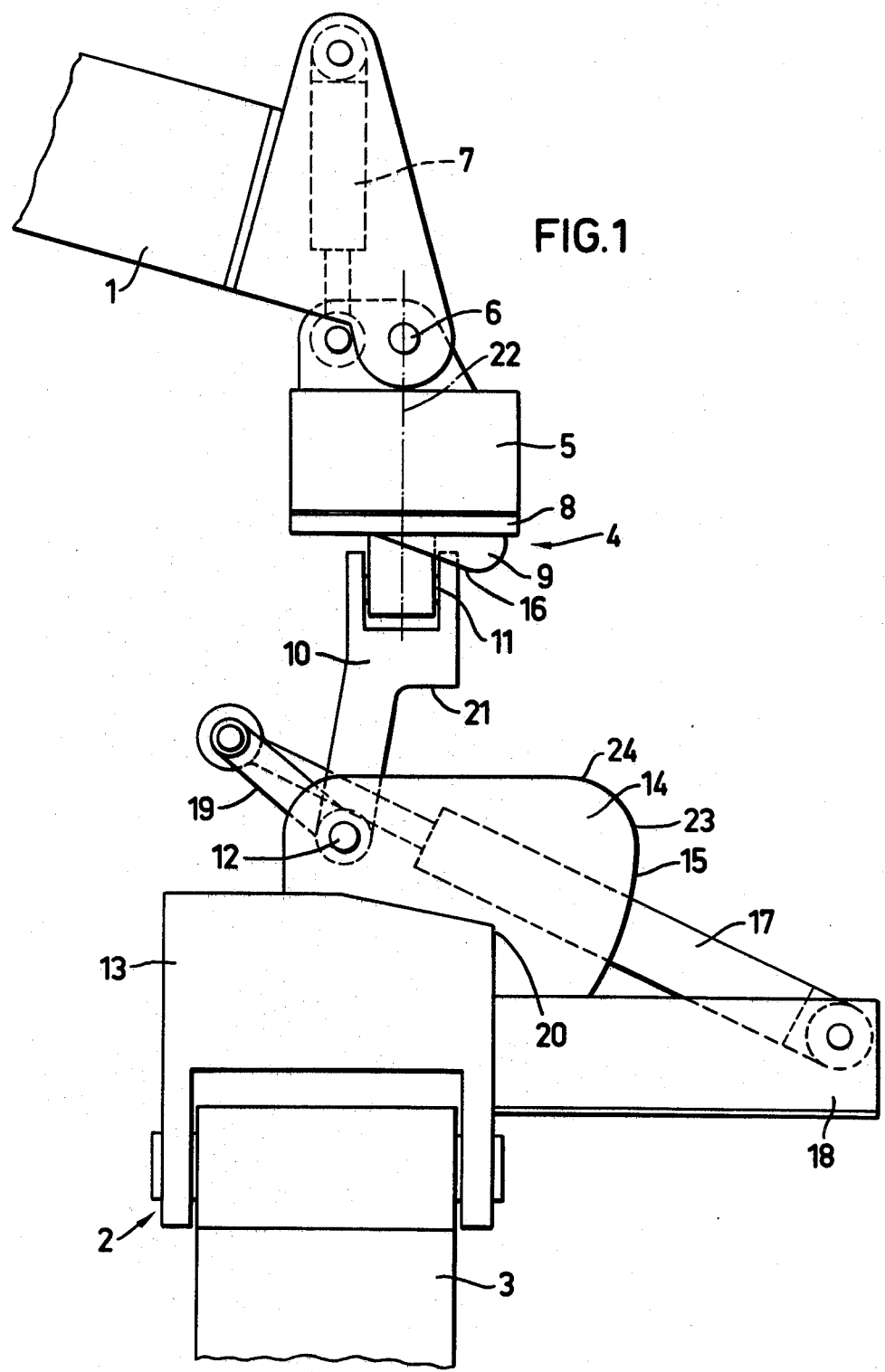
Figure 2:
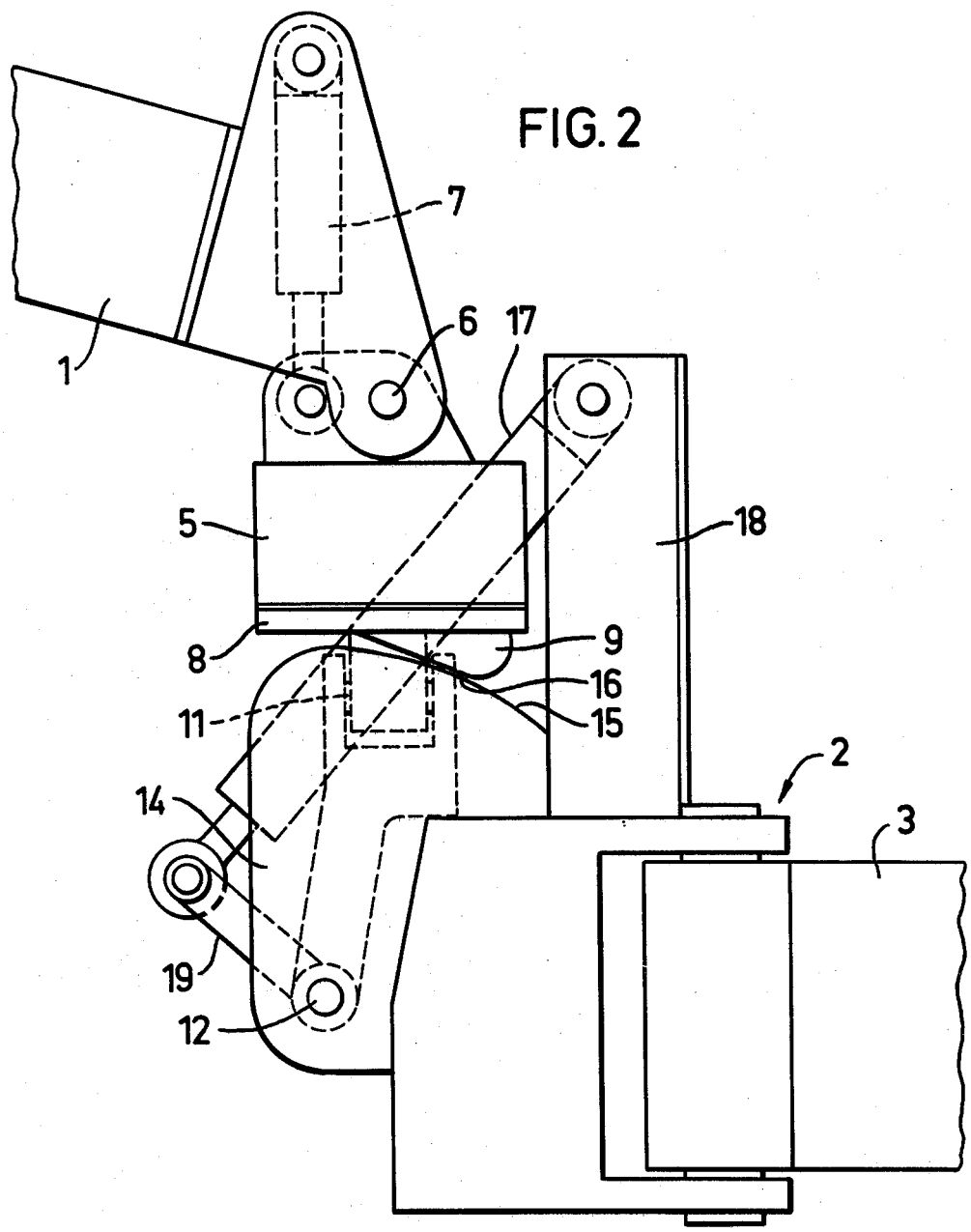
Figure 3:
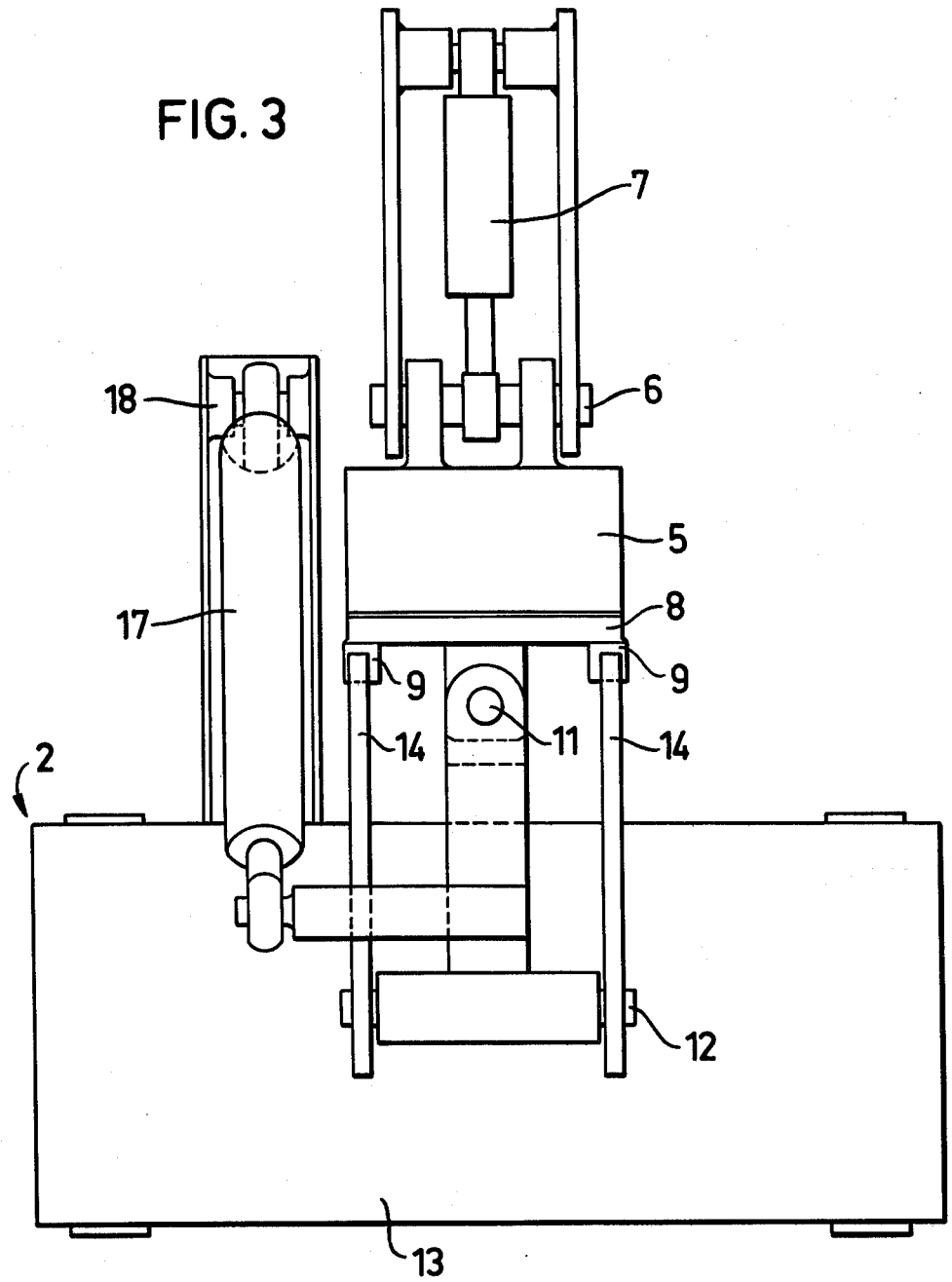
Figure 4:
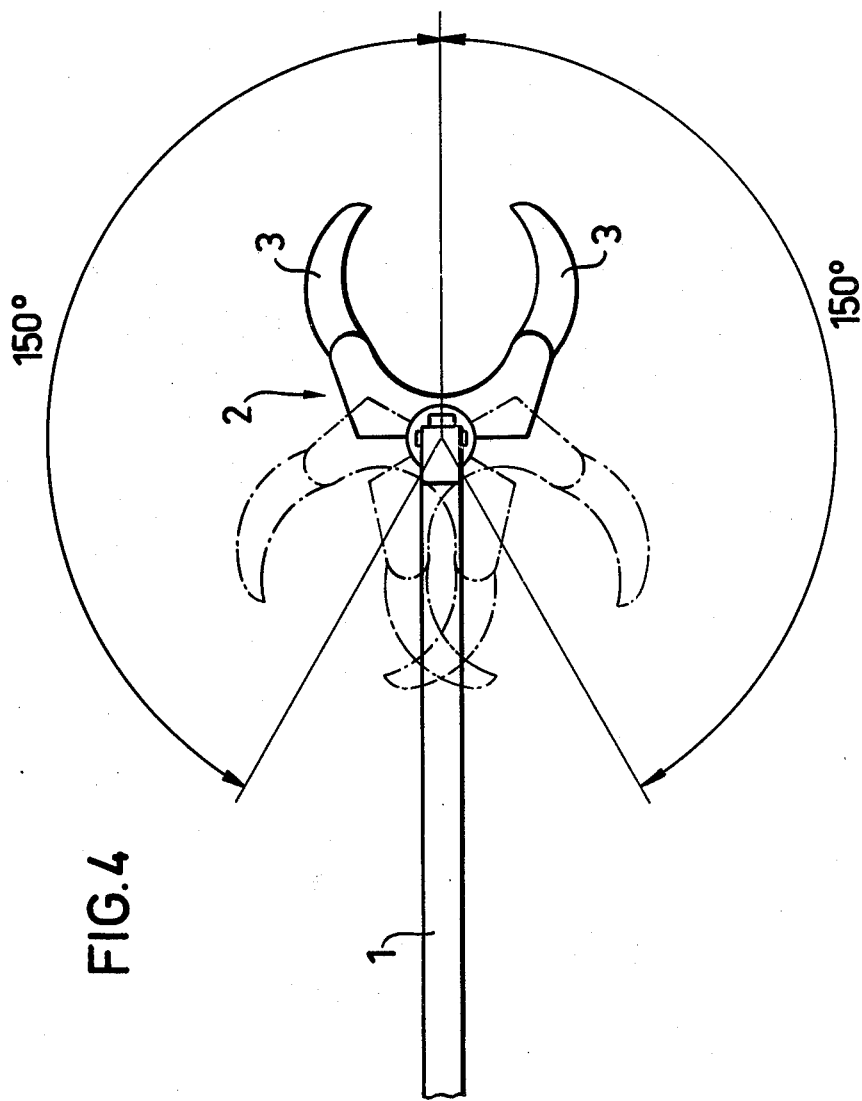
Figure 5:
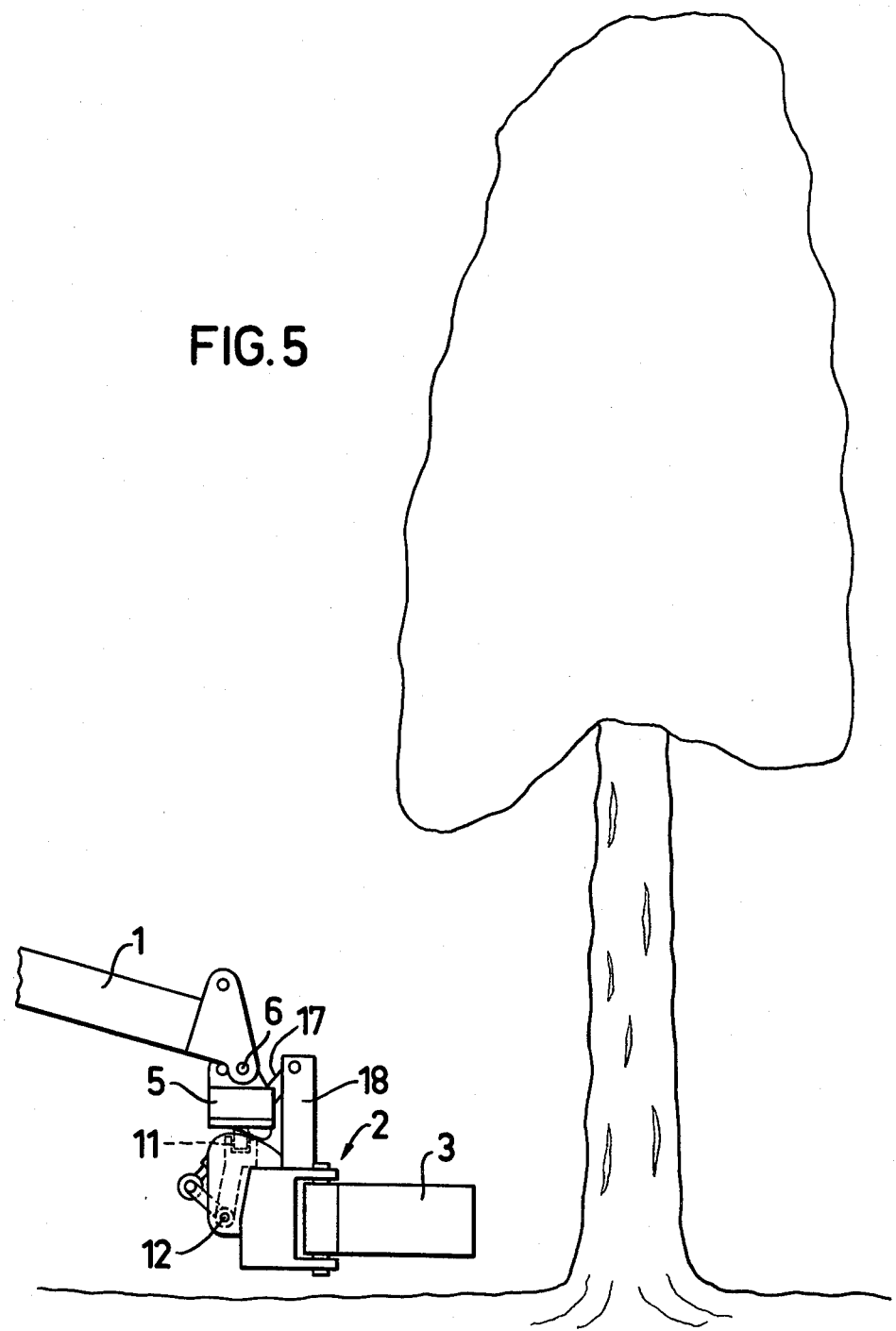
Figure 6:
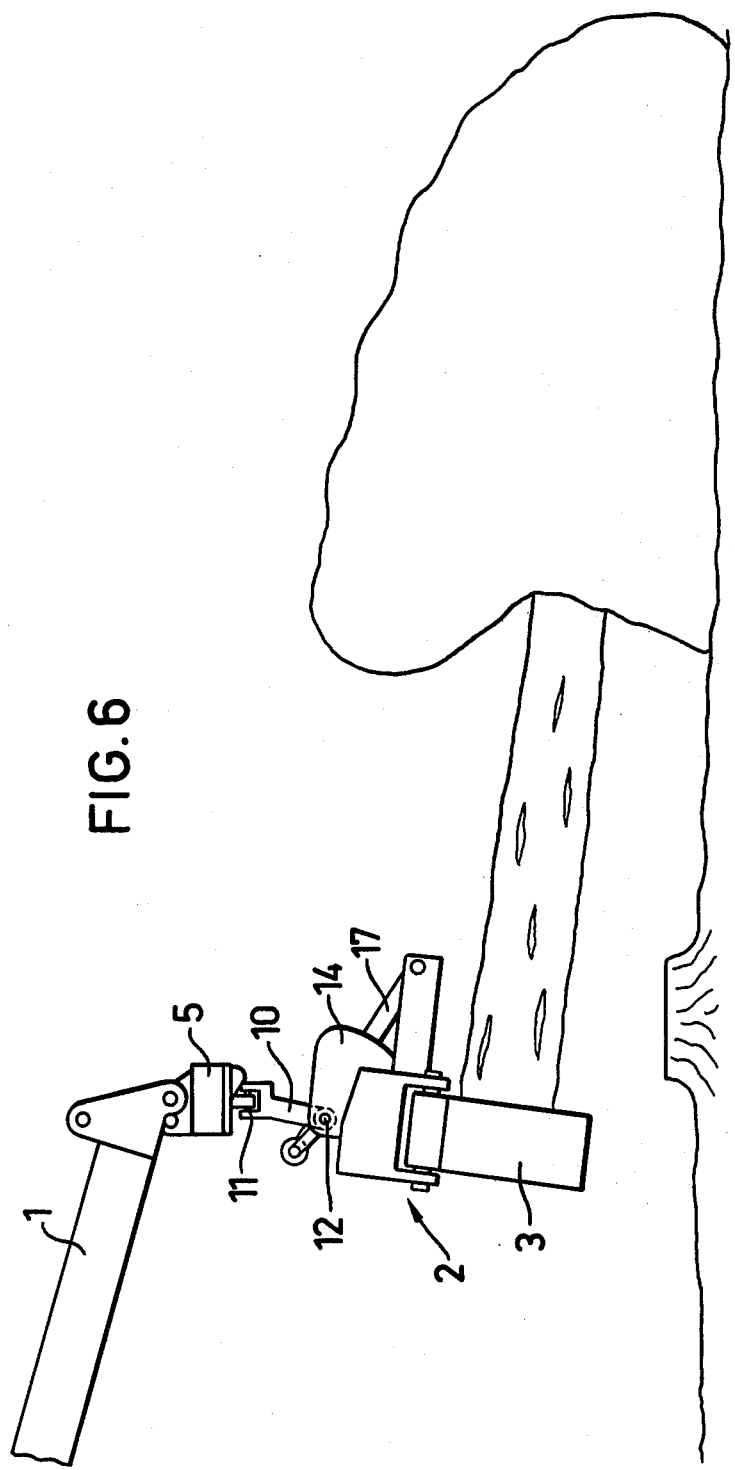
Figure 7:
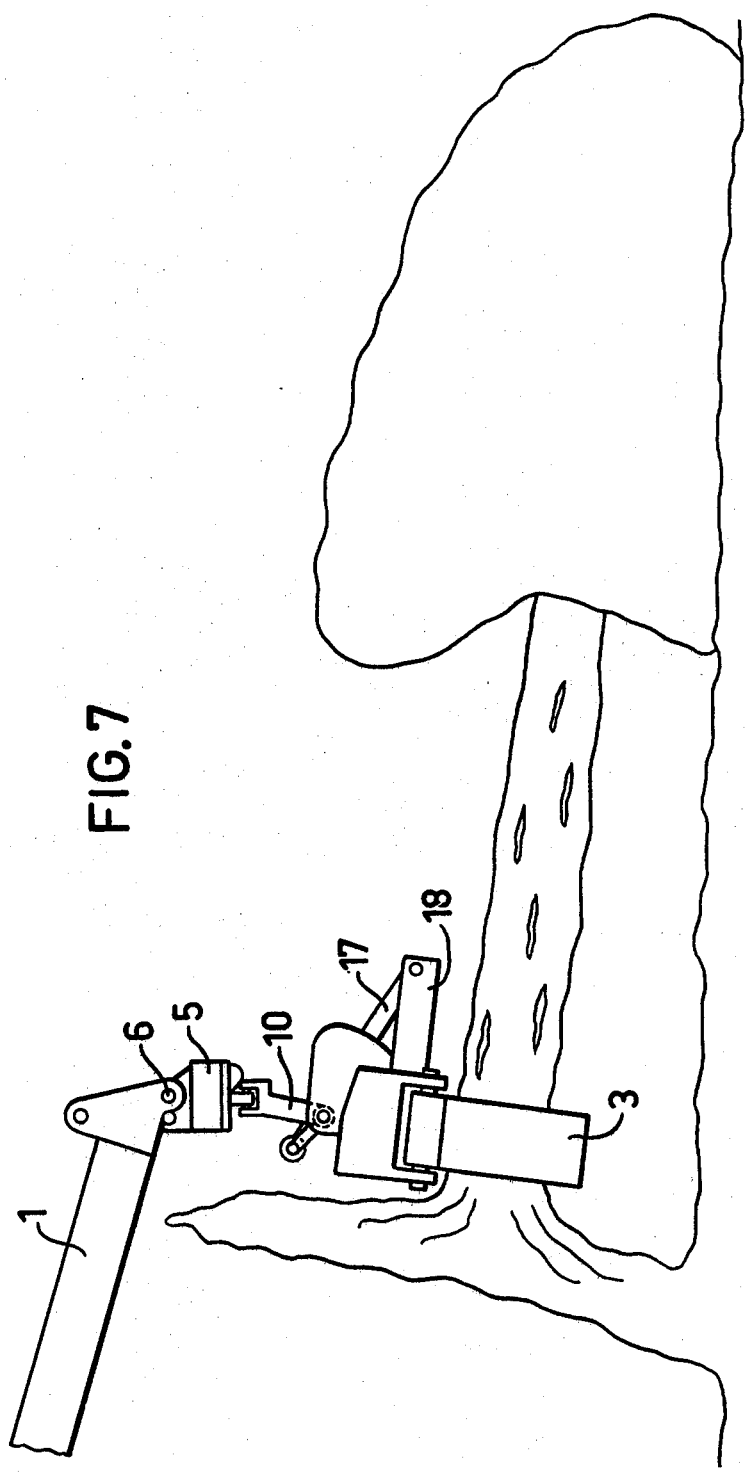

The invention is described in greater detail in the following, with reference to the accompanying drawings, in which FIGS. 1 and 2 are lateral views of a suspension device according to the invention, carrying a felling unit at a crane boom in a loosely suspended position and, respectively, in a folded-up operation position for felling standing trees, FIG. 3 is an end view of the device shown in FIG. 2, FIG. 4 is a schematic view from above for illustrating the angle of rotation of the device relative to the boom, FIG. 5 shows the device with the felling unit in folded-up operation position immediately prior to its engagement with a standing tree to be felled, FIG. 6 shows the device and the felling unit after the felling of a tree or in grappling position, and FIG. 7 shows the device and the felling unit arranged for cutting the roots of windthrow.

In the drawings, 1 designates a crane boom and 2 is a felling unit shown only schematically, which may be of any known type of cutting means, and which here is assumed to also comprise grapple means designated by 3. The felling unit 2 is suspended on the boom 1 by the suspension device according to the invention which generally is designated by 4 and comprises a rotator 5 for rotating the felling unit 2 in relation to the boom 1. The rotator 5 is pivotally mounted on the boom 1 by means of a journal 6, about which the rotator can be pivoted by a double-acting piston-cylinder device 7 hingedly attached between the boom 1 and rotator 5. At the rotator portion 8, which is rotatable relative to the boom 1 and on its lower surface is provided with two spaced locking shoulders 9, a link member 10 is hingedly suspended for being able to pivot about an axle 11 extending perpendicularly to the journal 6. The felling unit 2 is pivotally connected to said link member 10 by means of an axle 12. Said axle 12 forms with the axle 11 an angle, which at the embodiment shown is 90°. The axle 12 is supported on two plates 14, which are attached to the frame 13 of the felling unit and located directly in front of the locking shoulders 9 on the rotatable portion 8 of the rotator and, thus, have the same spaced relationship as said shoulders. The plates 14 are formed with locking surfaces 15, which along a part of their length have a radial distance to the centre of the axle 12 which corresponds to the shortest distance from said centre to the downward facing edge surfaces 16 of the locking shoulders so as in folded-up position of the felling unit shown in FIG. 2 to cooperate with the edge surfaces 16 of the locking shoulders in order to lock the upper axle 11 of the link member against movement and to fix the felling unit relative to the rotatable portion 8 of the rotator. The felling unit is folded up from the position shown in FIG. 1 to the fixed operative position shown in FIG. 2, in which position the felling unit, thus, is not movable relative to the rotatable portion 8 of the rotator, by means of a piston-cylinder device 17, which is hingedly attached between a bracket 18 mounted on the frame 13 of the felling unit and an arm 19 rigidly connected with the link member 10, by means of which device the felling unit is pivotal not only counterclockwise about the axle 12, but also slightly clockwise from the position shown in FIG. 1. Upon contraction of the piston-cylinder device 17, thus, the felling unit 2 is pivoted counterclockwise about the axle 12 until its surface 20 abuts a stop member 21 on the link member 10. In this position, in which the felling unit 2 assumes an angle of 90° in relation to the axis of rotation 22 of the rotator, the felling unit then is retained by the piston-cylinder device 17. While the felling unit is being folded up to this position, the locking surfaces 15 of the plates are pivoted inward beneath the downward facing edge surface 16 of the locking shoulders which act as locking surfaces, and by abutment thereto lock against pivotal movement about the upper axle 11 of the link member in such a manner, that the felling unit in its folded-up position cannot move relative to the rotatable portion 8 of the rotator. By means of the piston-cylinder device 7, which may be connected in parallel with the piston-cylinder device 17, the felling unit can be pivoted about the journal 6 and thereby accurately be adjusted relative to the tree to be felled, so that the cut is made substantially perpendicularly to the tree axis even in the case of inclined trees.

The felling direction of a tree can be determined and the felling unit be set to said direction prior or subsequent to the establishing of engagement between the felling unit and the tree. The felling unit is set in said direction by means of the rotator 5, which can turn the felling unit 2 through at least 150° in both directions from the position indicated by full lines in FIG. 4, so that the felling unit can be brought to engage with the tree in almost any suitable felling direction whatsoever. FIG. 5 shows by way of example how the felling unit is brought to abut a tree to be felled radially outward in the direction of the boom, and for this purpose, the felling unit is set in the position indicated by full lines in FIG. 4. After said abutment to and separation of the tree, the piston-cylinder device 17 is actuated to pivot the felling unit about the axle 12, whereby the tree is caused to fall in the predetermined felling direction with guidance by the cooperating locking surfaces 15, 16 of the plates and locking shoulders. As felling unit 2 progressively pivots from the FIG. 2 position, in the direction of the FIG. 1 position, the cooperating locking surfaces 15, 15 (on plates 14, 14) and locking surfaces 16, 16 (on spaced locking shoulders 9, 9) do not start separating from each other until after point 23 has passed locking surface 16. Axle 11 is not entirely free until point 24 on plate 14 has passed locking surface 16, thereby maintaining the axle 11 locked until the tree has assumed such an inclination that it safely will continue to fall in the predetermined felling direction even in the case of a strong wind blowing in a direction other than the felling direction. Thereby a so-called directional felling is realized.

In FIG. 6 a felled tree is shown. The felling unit 2 embraces the stem, and in this position the felling unit suspends freely from the axle 11. In this position the felling unit with grapple means can be used as a grapple for moving a tree, for example to position a felled tree in a delimbing machine or to load a tree on a forwarder or skidder etc. When the felling unit has cut off trees with small dimensions, the felling unit is capable of carrying these trees upright in its folded-up position, so that such trees may be removed without falling to the ground.

In FIG. 7 is illustrated that a felling unit suspended by means of the suspension device according to the invention also can efficiently be utilized for cutting the roots of fallen trees. The felling unit in this case usually is applied from above in its position freely suspended about the axle 11.

In addition to the above, the suspension device according to the invention also renders it possible that the felling unit in its folded-up position can be utilized for delimbing the lower portion of a tree stem thereby, that the felling unit with grapple means and certain parts of the frame provided with downward and/or upward facing cutting edges is moved downward or upward along the stem. It also is possible with the felling unit in its folded-up fixed position to remove snow about the tree to be felled and thereby to prevent unnecessarily high stumps.

The present invention is not restricted to the embodiments described above and shown in the drawings, but can be altered and modified in many different ways within the scope of the claims.

What I claim is:

1. A device for suspending a tree-felling unit on a crane boom comprising
    a rotator placed between said boom and the tree-felling unit for rotation of said unit in relation to the boom;
    means pivotally connecting said rotator to the boom;
    a link member having a first end and a second end, said link member connecting said tree-felling unit to the rotator;
    a first axle means pivotally connecting said first end of said link member to said rotator;
    a second axle means pivotally connecting said second end of said link member to the tree-felling unit;
    means for pivoting said tree-felling unit about said second axle means to an upper operative position, said first and second axle means being perpendicularly located relative to each other; and
    means for locking said link member against pivotal movement about said first axle means when the tree-felling unit is in said upper operative position.

2. A device according to claim 1, wherein the axis of the tree-felling unit when in said upper operative position forms an angle of about 90° with the axle of rotation of the rotator.

3. A device according to claim 1, further comprising an arm rigidly connected to said link member, said means for pivoting said tree-felling unit to said upper operative position comprising an actuating device acting between said tree-felling unit and said arm.

4. A device according to claim 3, wherein said actuating means comprises a double-acting piston-cylinder device.

5. A device according to claim 3, further comprising a second actuating means provided between the boom and the rotator for pivoting said rotator and thus the tree-felling unit, when the latter is in its upper operative position, about an axis of said means pivotally connecting said rotator to the boom.

6. A device according to claim 1, further comprising a second actuating means provided between the boom and the rotator for pivoting said rotator and thus the tree-felling unit, when the latter is in its upper operative position, about an axis of said means pivotally connecting said rotator to the boom.

7. A device according to claim 1, wherein said locking means comprises first members on a lower surface of that portion of the rotator which is rotatable relative to the boom, and second members on the felling unit, said first members, upon pivoting the felling unit to said upper operative position, cooperating with said second members to lock the link member against pivotal movement about said second axle means.

8. A device according to claim 7, wherein said first members comprise locking shoulders provided on the lower surface of the rotatable part of the rotator and having downward facing locking surfaces, and said second members comprise plates arranged on the felling unit directly in front of said locking shoulders and having locking surfaces spaced at a radial distance from the center of the attachment of the felling unit to said link member, said distance being substantially equal to the distance from said center to the downward facing locking surfaces of the locking shoulders, said locking surfaces of the locking shoulders being, upon the pivoting of the felling unit to said upper operative position, cooperatingly engaged with each other to lock said link member against movement about said second axle means.

9. A device according to claim 8, wherein said locking surfaces of the plates presents said radial distance along a part of length thereof then said distance decreasing substantially.

10. A device according to claim 1, wherein stop members are provided for defining said upper operative position of the felling unit.

* * * * *